United States Patent [19]

Watanabe

[11] 4,021,218

[45] May 3, 1977

[54] CHEMICAL METHOD OF STRENGTHENING GLASS ARTICLES SUBJECTED TO ABRASION RESISTANCE TREATMENT

[75] Inventor: Muneo Watanabe, Nishinomiya, Japan

[73] Assignee: Yamamura Glass Kabushiki Kaisha, Hyogo, Japan

[22] Filed: Nov. 13, 1975

[21] Appl. No.: 631,604

[30] Foreign Application Priority Data

Apr. 2, 1975   Japan ................ 50-39231

[52] U.S. Cl. .................. 65/30 E; 65/60 B; 427/107; 427/109; 427/252; 427/253

[51] Int. Cl.$^2$ ............. C03C 15/00; C03C 17/00; C03C 21/00

[58] Field of Search .............. 65/30 E, 30 R, 60 R, 65/60 B; 427/107, 109, 237, 252, 253

[56] References Cited

UNITED STATES PATENTS

| | | | |
|---|---|---|---|
| 3,473,906 | 10/1969 | Graham | 65/30 E |
| 3,477,834 | 11/1969 | Morris | 65/30 E |
| 3,778,243 | 12/1973 | Johnston | 65/60 B X |
| 3,827,871 | 8/1974 | Budd | 65/60 B |

FOREIGN PATENTS OR APPLICATIONS 471,307   1/1972   Japan

*Primary Examiner*—Robert L. Lindsay, Jr.
*Attorney, Agent, or Firm*—Wenderoth, Lind & Ponack

[57] ABSTRACT

This invention relates to a chemical method of strengthening glass articles subjected to abrasion resistance treatment, which comprises (1) a first step of applying a metal oxide-forming compound to the surface of a heated glass article to form the corresponding metal oxide coating having a thickness of 50 to 130 Angstrom on the surface of the glass article, (2) a second step of causing to adhere, to the outer and inner surfaces of the glass article, a mixed solution of potassium chloride and potassium nitrate, having a potassium chloride to potassium nitrate ratio by weight of 85 to 45:15 to 55, or a mixed solution of potassium sulfate and potassium nitrate, having a potassium sulfate to potassium nitrate ratio by weight of 30 to 100:70 to 0, (3) a third step of holding the glass article at an elevated temperature below the strain point of the glass but as near the strain point as possible for a period of time sufficient to obtain a compressive stress layer having a depth of at least 10 microns and a compressive stress of at least 700 kg/cm$^2$ and (4) a fourth step of cooling the glass article to room temperature and then washing the glass article to remove the mixture of the potassium salts remaining on the outer surface and inner surface of the glass article.

10 Claims, 5 Drawing Figures

FIG. IA
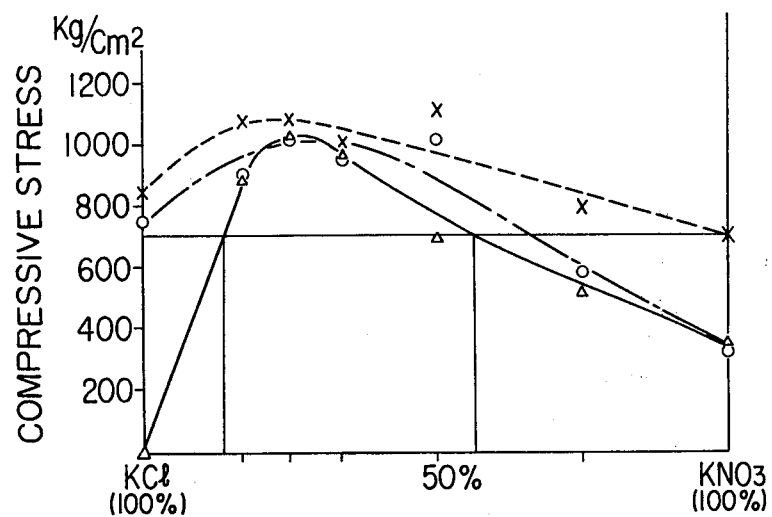
FIG. IB
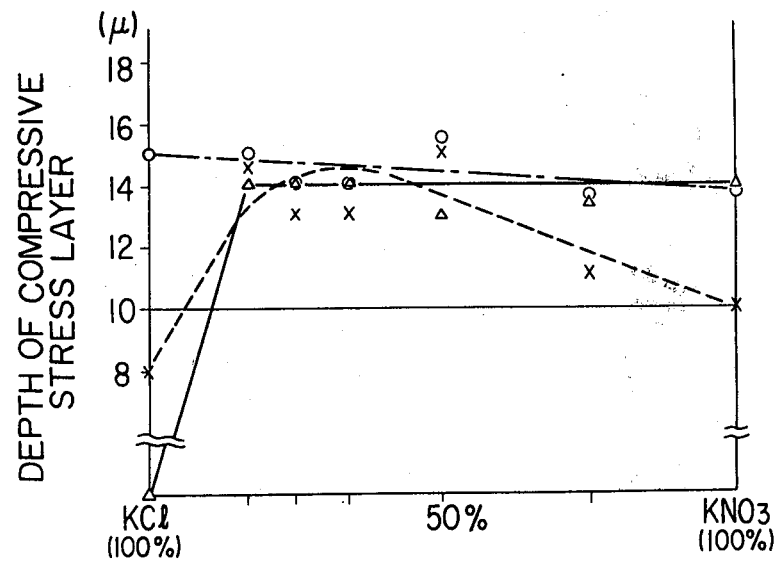

FIG. IC
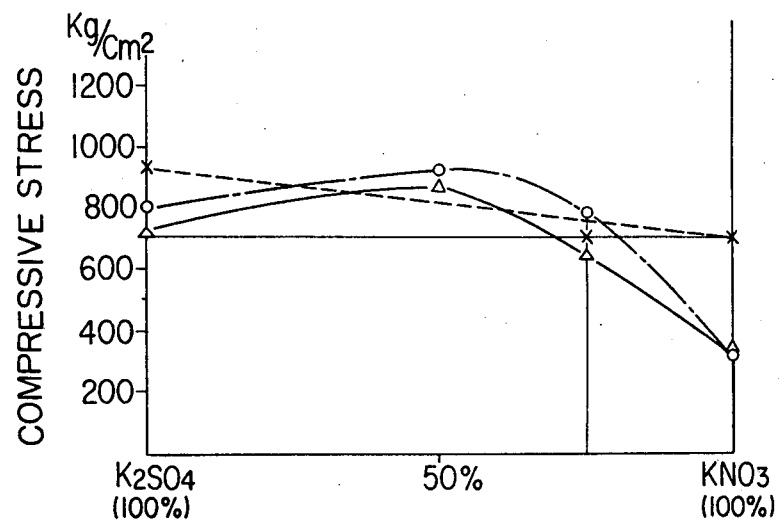
FIG. ID
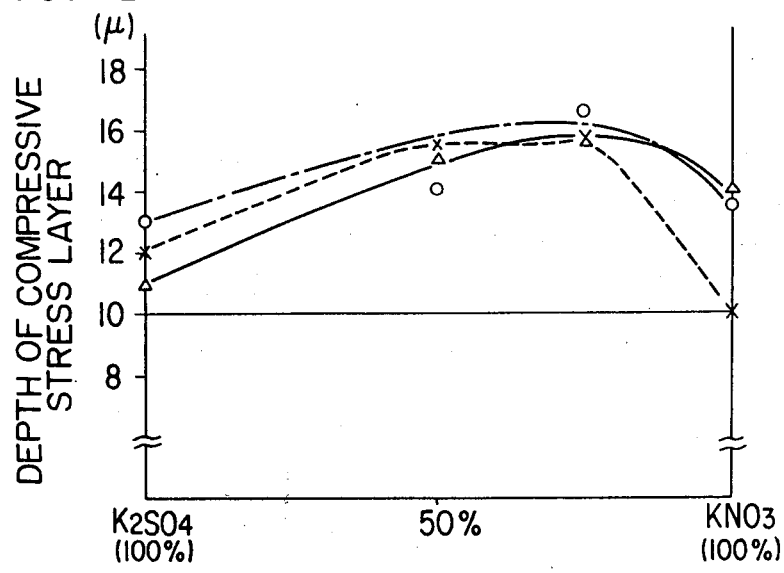

CHEMICAL METHOD OF STRENGTHENING GLASS ARTICLES SUBJECTED TO ABRASION RESISTANCE TREATMENT

BACKGROUND OF THE INVENTION

This invention relates to a chemical method of strengthening glass articles subjected to an abrasion resistance treatment and more particularly, it is concerned with a method of strengthening a glass article by chemically effecting exchange of a relatively larger radius ion, $K^+$ ions, for a smaller radius ion, $Na^+$ ions, in the surface layer of the interior or exterior of the glass article, which outer surface has been coated with a metal oxide, to thus form a compressive stress layer on the interior or exterior surface layer.

It is known in the prior art that the intrinsic strength of glass is very high, for example, more than 7,000 Kg/cm$^2$ in the non-scratched state, called "pristine glass", but, when the surface is bruised, the strength is substantially lowered, for example, to about 200 Kg/cm$^2$. When glass articles are handled, for example, during inspecting, bottling, capping, packaging and shipment, the glass articles are brought into contact or friction with each other and thus scratched or bruised, whereby their strength is lowered to a great extent.

Various proposals have hitherto been made in order to protect glass articles from scratching or bruising and to improve the strength thereof. For example, there has been proposed a method of increasing chemically the mechanical strength of glass by the so-called ion exchange method wherein ions A contained in the glass surface, such as sodium ions, are replaced with ions B having a larger ion radius, such as potassium ions. This chemical strengthening treatment is ordinarily carried out by the so-called immersion method comprising contacting a glass article with a potassium salt bath at an elevated temperature below the strain point to effect exchange of potassium ions for sodium ions, or by the so-called coating method comprising spraying a potassium salt solution onto a glass article or dipping a glass article in a potassium salt solution, while holding the glass article at an elevated temperature near the strain point, and holding the thus coated glass article at this temperature for a period of time sufficient to effect the ion exchange to thus produce a compressive stress layer. These methods are described in Japanese Patent Publication No. 28674/1965 (British Pat. No. 966,734), No. 6610/1973 (U.S. Pat. Nos. 3,498,773 and 3,473,906), No. 1316/1972 (U.S. Pat. No. 3,607,172) and No. 49298/1972 (British Pat. No. 1,010,164).

In Japanese Patent Publication No. 1307/1972 there is described a method of strengthening glass bodies by combining the above described ion exchange strengthening treatment with a metal oxide coating and polymer coating. This method involves treating the surface of a glass body at a high temperature with a metal compound to pyrolyze the metal compound immediately and to form the respective metal oxide film on the glass surface, then spraying the surface with an aqueous solution of potassium phosphate, maintaining the glass body at a temperature and for a period of time sufficient to effect the ion exchange reaction, cooling and washing and then spraying onto the glass surface an olefin polymer. In this method, a glass surface having a temperature of at least 530° C, immediately after being formed, is sprayed with a solution for ion exchange treatment. This method can be applied to light weight and thin glass articles but cannot be satisfactorily applied to thick glass articles, which must be treated at a temperature below the strain point. Furthermore, this method has the disadvantage that the ion exchange of the inner surface of a glass article is technically impossible because the glass article is treated at a high temperature as described above and there is therefore a danger of breakage of the glass article, and complex apparatus is required for the strengthening treatment of the inner surface of the glass article. Therefore, glass articles, in particular returnable bottles which are recovered and reused, tend to be scratched or bruised, during washing, on the inner surface thereof and are often broken. Also, according to the immersion method, the ion exchange of the inner surface of a high temperature glass article immediately after being formed cannot be easily effected because of the danger of breakage, and usually can only be effected by inserting in the glass article a nozzle through which a treating solution is fed. In this method, however, it is also necessary to hold the glass article at a high temperature so that it is not deformed and to use a heat resisting holder for holding the glass article, which can resist sufficiently high temperatures. Similarly a heat resisting material which can resist sufficiently high temperatures must be used for the nozzle to be inserted in the glass article. Unless centering of the above described nozzle is suitably carried out, the nozzle is contacted with the opening portion of the glass article when it is inserted to thus deform or break the opening portion and thus lower the value of the glass article. In order to solve this problem, a complex centering technique is required. In the case of a thick glass article, furthermore, there arise other troublesome problems, for example, breakage due to thermal shock, since the treatment of the glass surface at an elevated temperature below the strain point followed by quenching results in a temperature difference between the surface and inside due to a low heat conductivity of glass, so that the surface contracts more than the inside, and a tensile stress is produced on the surface and a compressive stress is produced on the inside.

When a glass article is shocked on the outer surface, a tensile stress is produced on the inner surface and the glass article is often broken. Therefore, it is necessary for practical use to strengthen both the outer and inner surfaces of a glass article. We have already proposed a method for strengthening both surfaces of glass articles in Japanese Patent Application No. 136182/1973. It will be understood from this prior invention that a beer bottle (Special Container Form: Form No. 7, Volume 633 ml) whose outer and inner surfaces are chemically strengthened is very superior in pressure resistance and shock resistance to a beer bottle whose outer surface only is chemically strengthened. That is to say, the additional chemical strengthening treatment of the inner surface of a glass container can produce unexpected results.

As a surface treating agent for the ion exchange strengthening treatment of glass articles various potassium salts have been used, for example, potassium nitrate (MP = 330° C), potassium chloride (MP = 790° C), potassium sulfate (MP = 1069° C), potassium carbonate (MP = 891° C), tribasic potassium phosphate (MP = 1340° C), potassium metaphosphate (MP = 807° C), potassium bromide (MP = 730° C) and potassium iodide (MP = 723° C). Some of these compounds tend to be hydrolyzed in aqueous solutions when applied to glass surfaces by spraying or dipping, thereby giving alkalinity and etching the glass surface. In the case of potassium carbonate, for example, potassium hydroxide formed by hydrolysis thereof etches glass. Tribasic potassium phosphate, potassium metaphosphate, potassium iodide and potassium bromide also have a similar tendency.

However, three potassium salts, potassium nitrate, potassium chloride and potassium sulfate, can favourably be used without the above described disadvantage, since even if these salts are hydrolyzed their hydrolyzed products are neutral and do not etch glass, thus the appearance of the treated glass remains transparent. We have now found, as a result of various experiments on the ion exchange strengthening treatment of a glass article having a metal oxide layer on the surface thereof using a mixed solution of potassium nitrate, potassium chloride and potassium sulfate, that a compressive stress layer and a sufficient compressive stress value can be realized by controlling, in particular, the thickness of the metal oxide layer to be initially applied, the adhesion time or temperature of the ion exchange solution and the mixing ratio of the above described three potassium salts.

SUMMARY OF THE INVENTION

It is an object of the invention to provide a chemical method of strengthening glass articles subjected to an abrasion resistance treatment.

It is another object of the invention to provide a method of strengthening glass articles by combining a metal oxide coating for abrasion resistance and a chemical strengthening treatment.

It is a further object of the invention to provide a strengthened glass article or glass container having a compressive stress layer on both the outer and inner surfaces.

These objects can be accomplished by a method which comprises (1) a first step of applying a metal oxide-forming compound, for example, a tin- or titanium-containing compound, to the surface of a heated glass article to form the corresponding metal oxide film, for example, a tin oxide or titanium oxide film, having a thickness of 50 to 130 Angstrom on the surface of the glass article, (2) a second step of adhering, to the inner and outer surfaces of glass article, at a low temperature, a mixed solution of potassium chloride and potassium nitrate having a potassium chloride to potassium nitrate ratio of 85 – 45 : 15 – 55 by weight, a part of the potassium chloride and potassium nitrate being optionally substituted by potassium sulfate, or a mixed solution of potassium sulfate and potassium nitrate having a potassium sulfate to potassium nitrate ratio of 30 – 100 : 70 – 0 by weight, a part of the potassium sulfate and potassium nitrate being optionally substituted by potassium chloride where potassium nitrate is not zero, and, optionally, a small amount of wetting acid, (3) a third step of holding the glass article at an elevated temperature below the strain point of the glass article but as near the strain point as possible for a period of time sufficient to obtain a compressive stress layer of at least 10 microns in depth and a compressive stress of at least 700 kg/cm$^2$ and (4) a fourth step of cooling the glass article to room temperature and then washing the glass article to remove the mixture of the potassium salts remaining on the inner surface and outer surface of the glass article.

BRIEF DESCRIPTION OF THE DRAWING

The accompanying drawings illustrate the principle and merits of the invention in greater detail.

FIG. 1 (A) shows graphically the relation of the compressive stress of a chemically strengthened glass article with the composition of KCl—KNO$_3$ mixed solutions, FIG. 1 (B) shows graphically the relation of the depth of compressive stress layer of a chemically strengthened glass article with the composition of KCl—KNO$_3$ solutions, FIG. 1 (C) shows graphically the relation of the compressive stress of a chemically strengthened glass article with the composition of K$_2$SO$_4$—KNO$_3$ mixed solutions, FIG. 1 (D) shows graphically the relation of the depth of compressive stress layer of a chemically strengthened glass article with the composition of K$_2$SO$_4$—KNO$_3$ solutions

DETAILED DESCRIPTION OF THE INVENTION

Figure 2:
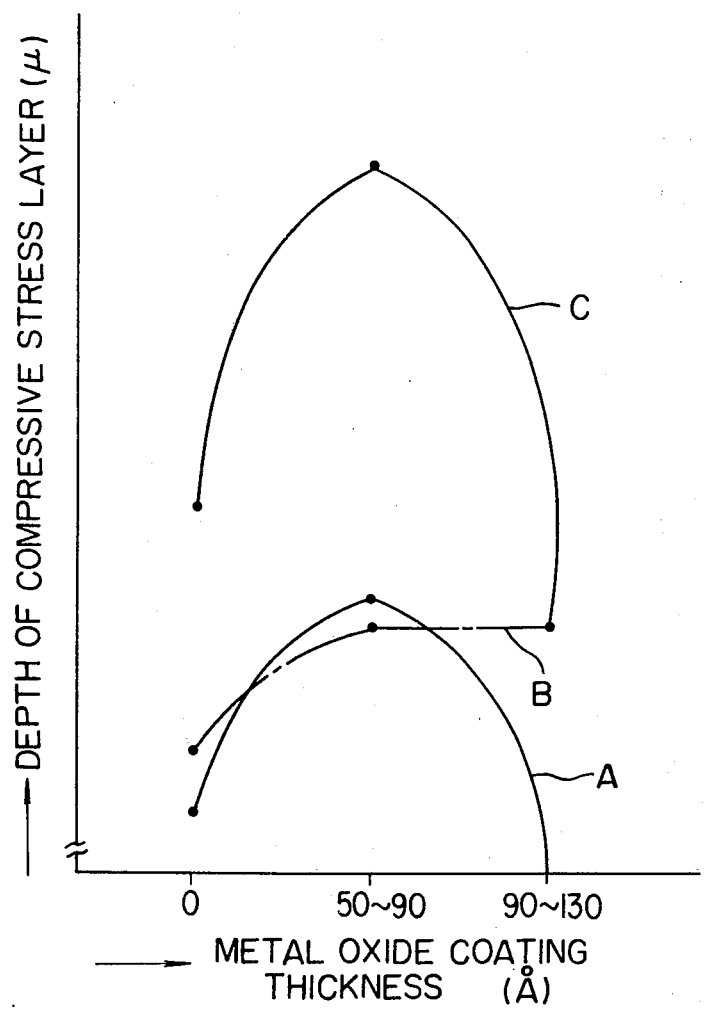
FIG. 2 shows graphically the relation of the depth of compressive stress layer of a chemically strengthened glass article with the thickness of a metal oxide coating using a solution of KCl or KNO$_3$ or a mixed solution of KCl—KNO$_3$.

Hitherto, it has been considered that, when the thickness of a metal oxide coating is sufficient enough to result in effective abrasion resistance, the ion exchange reaction does not take place, or hardly takes place, and thus the practical effect of the ion exchange strengthening treatment is minimal. This is apparent from U.S. Pat. No. 3,403,015 which describes a method of determining whether or not a transparent metal oxide protective coating applied to a sodium-containing glass surface is uniformly formed. This method is based on the concept that if a metal oxide coating has a sufficient thickness, no ion exchange reaction takes place, while if the thickness is not sufficient, the ion exchange reaction does take place. At column 4, line 74 to column 5, line 11 of this patent, there is a description that "After the glassware has been treated with the metallic compound to provide a transparent oxide coating on the surface of the glass, the glass is contacted with a molten salt bath at elevated temperature for a sufficient period of time to permit an ion exchange between a selected ion in the molten salt bath and a different ion, usually sodium which is present in the surface of the glass, but the ion exchange takes place only in that area which does not have applied thereto a satisfactory protective coating. The ion exchange will render visible the area unprotected by the metallic oxide coating which will then be immediately observable and indicate an unsatisfactory application of the protective coating".

This problem is overcome by the method described in Japanese Patent Publication No. 1307/1972, but this method has a disadvantage that a thick container cannot favourably be treated at a temperature below the strain point, and an inner surface strengthening treatment cannot be applied, so that it is difficult to prevent inner surface scratches and, when the outer surface is shocked, a tensile stress is produced inside, resulting in a marked tendency to break. Moreover, potassium phosphate (K$_3$PO$_4$) described in the above described publication and potassium carbonate (K$_2$CO$_3$) described in Japanese Patent Publication No. 6610/1973 have the problem of etching as described above and have no practical use.

Considering these problems, we have made various experiments and found that the thickness of the metal oxide coating of the outer surface of the glass article may be up to 130 Angstrom. If it is more than 130 Angstrom, the cost becomes high and a problem of coloration arises on the surface due to light interference. If it is less than 50 Angstrom in thickness, the chemically strengthened layer of the glass article is subject to abrasion or scratching so that the strength of the glass article is substantially lowered. Therefore, the thickness of the abrasion resistance coating is preferably in the range of 50 to 130 Angstrom, most preferably 70 to 100 Angstrom. Furthermore, it is confirmed that, when the thickness of a metal oxide coating is sufficient, that is, in the range of 50 to 130 Angstrom as described above, a sufficient compressive stress layer and compressive stress value can be attained by causing to adhere, to a glass article, at a low temperature, a mixed solution of the foregoing three potassium salts, that is, potassium chloride, potassium nitrate and potassium sulfate in suitable proportions, and then holding the glass article at an elevated temperature below the strain point of the glass but as near the strain point as possible for a period of time sufficient to obtain the stress layer.

In the method of the invention, a tin-, titanium-, zirconium- or vanadium-containing compound is used to form such a metal oxide. Examples of the tin-containing compound are tin tetrachloride, dimethyltin dichloride, tin dichloride, dibutyltin diacetate, dibutyltin maleate, stannous oleate, stannous stearate and stannous palmitate. Examples of the titanium-containing compound are titanium tetrachloride, tetrabutyl titanate, isopropyl titanate and tetrahexyl titanate. As the zirconium-containing compound there can be used alkyl zirconates, in particular those having 8 or less carbon atoms, such as tetrabutyl zirconate, and zirconium tetrahalides such as zirconium tetrachloride, as disclosed in Japanese Patent Publication No. 1758/1967 and U.S. Pat. No. 3,379,559. As the vanadium-containing compound there can be used alkyl vanadates, in particular those having 1 to 8 carbon atoms, such as n-butyl vanadate, vanadyl trichloride, vanadium tetrachloride, vanadium penta-oxide, ammonium metavanadate and vanadium tetraiodide, as disclosed in U.S. Pat. No. 3,441,399. These compounds can be used individually or in combination. Formation of the metal oxide can for example be carried out by generating tin tetrachloride vapor, applying the vapor to a glass container at a high temperature and forming tin oxide film on the surface thereof.

When the ion exchange reaction is carried out according to the present invention, a treating salt, such as a potassium salt, is adhered to a glass surface in a fused state, preferably, in a partially fused state or partially solid state because, if the salt is completely fused, it is partly lost during the treatment and a sufficient stress layer and stress value cannot be attained. Furthermore, the composition of the mixed salt is preferably adjusted so that the liquidus temperature of the mixed salt is higher than or near the strain point.

That is to say, in the case of using each of these potassium salts individually, a sufficient stress layer and stress value cannot be obtained as is evident from the terminal portions of FIG. 1. FIG. 1 (A) and FIG. 1 (B) are graphs showing the compressive stress value and depth of compressive stress layer obtained by the ion exchange method using various $KCl$—$KNO_3$ mixed solutions, and FIG. 1 (C) and FIG. 1 (D) are graphs showing the compressive stress value and depth of compressive stress layer obtained by the ion exchange method using various $K_2SO_4$—$KNO_3$ mixed solutions. In FIG. 1, marks x, o, and Δ show, respectively curves where the thicknesses of previously formed metal oxide coatings are 0, 50 to 90 and 90 to 130 Angstrom.

There are various potassium salts which have hiterto been considered useful for ion exchange strengthening, but, when the ion exchange strengthening treatment is carried out on an industrial scale using these salts, it is required to produce a sufficient compressive stress layer and compressive stress value with a high efficiency. To this end, a solution whose concentration is adjusted to as high as possible must be used. This concentration is generally determined depending upon the variety of potassium salts. The solubilities of potassium salts such as potassium phosphate ($K_3PO_4$), potassium nitrate ($KNO_3$), potassium chloride ($KCl$), potassium sulfate ($K_2SO_4$), potassium hydrogen phosphate ($K_2HPO_4$), potassium carbonate ($K_2CO_3$), potassium iodide ($KI$) and potassium bromide ($KBr$) in 100 g of water at 50° C (40° C for $K_2HPO_4$) are as follows:

| $K_2HPO_4$ (212; 40° C) | $K_3PO_4$ (169) | $KI$ (168) | $KNO_3$ (85) | $KBr$ (80) | $K_2CO_3$ (55) | $KCl$ (42) | $K_2SO_4$ (17) |
|---|---|---|---|---|---|---|---|

The figures in the parentheses show grams dissolved. The use of a potassium salt to give a high concentration, such as $K_2HPO_4$ or $K_3PO_4$, is ideal but the use of $K_2HPO_4$, $K_3PO_4$, $KI$, $KBr$ or $K_2CO_3$ in the form of an aqueous solution is undesirable since the alkaline solution formed through hydrolysis etches the glass surface. However, $KNO_3$, $KCl$ and $K_2SO_4$ do not exhibit this problem. When using $KNO_3$, $KCl$ and $K_2SO_4$ individually, for example, using $KCl$, having a higher melting point, alone, however, wetting of the glass surface is low at a temperature of 500° C, such that the boundary of the glass surface and air is substituted by a boundary between the glass and fused salt. When using $KNO_3$, having a lower melting of 330° C, alone, this salt tends to flow and is lost during the ion exchange treatment, which means that the adhered potassium salt is lost in a quantity greater than the quantity changed by the ion exchange. Consequently, a sufficient compressive stress layer and compressive stress value cannot be obtained.

When using a mixed solution of potassium chloride and potassium nitrate at a suitable ratio, for example, $KCl$ to $KNO_3$ weight ratio of 3 : 1 as the treating solution, on the contrary, the potassium chloride prevents the potassium nitrate from flowing and raises the diffusion efficiency of the potassium nitrate to the glass surface, to obtain a sufficiently high compressive stress and compressive stress layer. The abnormal peak shown in FIG. 1 (A) or (B) corresponds possibly to the synergistic effect of the mixed solution. When the treatment is carried out using a mixed solution of potassium sulfate and potassium nitrate at a suitable ratio, a similar phenomenon appears as shown in FIG. 1 (C) or (D). It is also described in Japanese Patent Publication No. 49298/1972 to use a mixed solution of potassium chloride and potassium nitrate but, in this case, the dipping method is carried out using a mixed solution containing potassium nitrate in a predominant molar percent. In the method of the present invention, on the contrary, the compressive stress value or strength of glass decreases with the increase of the proportion of potassium nitrate as shown in FIG. 1 (A) and (B). Furthermore, the use of a mixed solution of potassium chloride and potassium carbonate is described in Japanese Patent Publication No. 6610/1973, but, in this case, mixing these salts causes worse results, and fails to produce the special phenomenon as results in the present invention.

Referring to FIG. 2 showing graphically the relation of the depth of compressive stress layer with the thickness of a metal oxide coating, Curve A corresponds to the case of using potassium chloride alone, wherein there is a peak of compressive stress layer of 15 microns at a metal oxide thickness of 50 to 90 Angstrom, while Curve B corresponds to the case of using potassium nitrate alone, wherein the stress layer increases gradually up to a thickness of 50 to 90 Angstrom and gives hardly any noticeable increase in depth of the compressive stress layer when the thickness of the oxide coating is increased from a range of 50 to 90 Angstrom to a range of 90 to 130 Angstrom. From these facts, the presence of Curve C showing a maximum peak of compressive stress layer at a metal oxide coating thickness of 50 to 90 Angstrom is assumed in the case of using a mixed solution of potassium chloride and potassium nitrate ($KCl : KNO_3 = 1 : 1$). This assumption is supported by the experimental results as shown in FIG. 1.

In the method of the present invention, a glass article having a specified coating thickness of metal oxide is chemically strengthened by a particular combination or composition of potassium salts selected from potassium chloride, potassium nitrate and potassium sulfate, for example, by a mixed solution of potassium chloride and potassium nitrate having a KCl to $KNO_3$ weight ratio of 85 to 45 : 15 to 55, or by a mixed solution of potassium sulfate and potassium nitrate having a $K_2SO_4$ to $KNO_3$ weight ratio of 30 to 100 : 70 to 0. It will be apparent from FIG. 1 that a desirable compressive stress layer and compressive stress value cannot be obtained outside this ratio range.

In the method of the present invention, the case of using potassium sulfate and potassium nitrate in combination includes the case of $KNO_3 = 0$. In this case, that is, when using potassium sulfate alone, a predetermined compressive stress layer and compressive stress value can be obtained, but is not preferred since potassium sulfate has a low solubility and it is impossible to prepare a chemical strengthening solution thereof with a high concentration.

In the mixed solution of potassium chloride and potassium nitrae having the above described composition, any of the potassium salts can optionally be partially substituted by potassium sulfate, and in the mixed solution of potassium sulfate and potassium nitrate, any of the potassium salts can optionally be partially substituted by potassium chloride where potassium nitrate is not zero. Furthermore, the composition of the mixed solution is so chosen that the liquidus temperature of the mixed potassium salt is higher than the strain point of a glass article to be treated but as near the strain point as possible.

As occasion demands, a wetting aid such as anionic surfactants can be added to the mixed solution in a proportion of 0.2 to 1 %, preferably 0.5 %. The temperature of the mixed solution is preferably 50°–75° C, since if lower than 50° C, the solubility of the mixed solution is too low to obtain a sufficient compressive stress and compressive stress layer and if higher than 75° C, the wetting aid is often decomposed. The temperature of a glass article such as glass bottle is preferably 30° – 75° C, in particular, 50° – 60° C when the mixed solution is applied thereto, since if lower than 30° C, the solubility of the salt is lowered and if higher than 75° C, the wetting aid is often decomposed.

According to the method of the present invention, glass articles can be chemically strengthened to a greater extent than glass articles whose outer and inner surfaces are chemically strengthened by ion exchange according to our prior proposal (Japanese Patent Application No. 136182/1973). That is to say, the pressure strength of the glass article is lowered to about 40% of its original strength after 30 trips (one trip represents the bottling-capping-packaging-shipment-market-recovery cycle) in the case of chemically strengthening the outer surface and inner surface of the glass article according to our prior proposal, while according to the method of the present invention, the pressure strength is at least 80% of the original strength even in the case of using bottles of light weight. For example, an initial pressure strength of 39.2 kg/cm² is lowered only to 32.7 kg/cm² after 30 trips.

The present invention will be further illustrated in greater detail in the following examples and comparative examples. It will be self-evident to those skilled in the art that the ratios, ingredients and the order of operations can be modified within the scope of the present invention. Therefore, the present invention should not be interpreted as limited to the following examples. All parts, percents and the like are by weight, unless otherwise indicated.

EXAMPLE 1

A high temperature glass container (about 500° to 600° C) having a strain point of 505° C was formed from an ordinary soda-lime-silica glass consisting of 72% by weight $SiO_2$, 2% $Al_2O_3$, 14% $Na_2O$, 1 % $K_2O$, 10 % CaO, 0.4 % MgO and trace impurities and minor constituents by means of a glass forming machine and immediately contacted with a vapor of tin tetrachloride to form on the surface a tin oxide coating having a thickness of 50 to 90 Angstrom (A) (average: 70 A) or thickness of 90 to 130 A (average: 110 A), measured by Hot End Coating Meter (Ser. No. 106) manufactured by American Glass Research Inc. The glass article coated in this manner was passed through a lehr and cooled to room temperature. For comparison, another glass container without the tin oxide coating was prepared.

A mixture of potassium chloride and potassium nitrate having a KCl to $KNO_3$ weight ratio of 2 : 1 was dissolved in as little warm water as possible at 50° C to prepare a high concentration treating solution. The inner surface of each of the glass containers was uniformly coated with the treating solution and the outer surface was dipped in the treating bath or sprayed with the treating solution. Then the glass container was preheated at 130° C for 30 minutes in a drier, and the outer surface only was further sprayed with the treating solution, subjected to a heat treatment at 500° C for 60 minutes, cooled and washed. If necessary, the outer surface was coated with a lubricant, Pericoat (Trade Mark manufactured by Chukyo Kasei Co.). A thin piece of 300 microns was cut from the resultant product and subjected to measurement of the compressive stress layer and compressive stress value using a polarization microscope. The results are shown in the following Table, Run No. (2).

Run Nos. (1) to (4), (6) and (9) of this Table correspond to the embodiments of the invention and others are given for comparison. In Run Nos. (1), (6) and (9), measurement of the inner surface strength was not carried out, but such strength can somewhat be predicted from the whole strength and outer surface strength of the glass article.

EXAMPLE 2

The procedure of Example 1 was repeated except using a treating solution containing potassium chloride and potassium nitrate having a weight ratio of 1 : 1 to obtain results shown in the Table, Run No. (1).

EXAMPLE 3

The procedure of Example 1 was repeated except using a treating solution containing potassium chloride and potassium nitrate having a weight ratio of 3 : 1 to obtain results shown in the Table, Run No. (3).

EXAMPLE 4

The procedure of Example 1 was repeated except using a treating solution containing potassium chloride and potassium nitrate having a weight ratio of 5 : 1 to obtain results shown in the Table, Run No. (4).

EXAMPLE 5

The procedure of Example 1 was repeated except using a treating solution containing potassium sulfate and potassium nitrate having a weight ratio of 1 : 1 to obtain results shown in the Table, Run No. (6).

EXAMPLE 6

This example illustrates a case where a part of the potassium chloride and potassium nitrate is replaced by potassium sulfate.

The procedure of Example 1 was repeated except using a treating solution containing potassium chloride, potassium nitrate and potassium sulfate having a weight ratio of 3 : 1 : 1 to obtain results shown in the Table, Run No. (9).

For comparison, the procedure of Example 1 was repeated except for using treating solutions containing potassium chloride only, potassium nitrate only, potassium sulfate only, a mixture of potassium chloride and potassium nitrate having a weight ratio of 1 : 3, a mixture of potassium sulfate and potassium nitrate having a weight ratio of 1 : 3 and a mixture of potassium sulfite and potassium nitrate having a weight ratio of 5 : 3 to obtain results as shown in the Table.

The present invention is hereinbefore illustrated by Examples using tin oxide as a metal oxide coating, but it will be apparent to those skilled in the art that similar results are attained when using other metal oxides, for example, titanium oxide.

Table

Stress Layer and Stress Value for Thickness of Metal Oxide

| Run No. | Treating Solution | Surface Applied | Thickness of Metal Oxide A.G.R. A | | | | | |
|---|---|---|---|---|---|---|---|---|
| | | | 0 Å | | 50–90 Å (Mean 70 Å) | | 90–130 Å (Mean 110 Å) | |
| | | | Stress Layer μ | Stress kg/cm² | Stress Layer μ | Stress kg/cm² | Stress Layer μ | Stress kg/cm² |
| (1) | KCl + KNO₃ (1:1) | Outer Surface | 15 | 1100 | 15.5 | 1008 | 13 | 693 |
| (2) | KCl + KNO₃ (2:1) | Outer Surface | 13 | 993 | 14 | 942 | 14 | 962 |
| | | Inner Surface | | | 14 | 760 | 14 | 760 |
| (3) | KCl + KNO₃ (3:1) | Outer Surface | 13 | 1064 | 14 | 1010 | 14 | 1009 |
| | | Inner Surface | | | 14 | 800 | 14 | 800 |
| (4) | KCL + KNO₃ (5:1) | Outer Surface | 14.5 | 1061 | 15 | 886 | 14 | 870 |
| | | Inner Surface | | | 14 | 750 | 14 | 760 |
| (5) | KCl + KNO₃ (1:3) | Outer Surface | (11) | (780) | (13.6) | (580) | (13.4) | (520) |
| (6) | K₂SO₄ + KNO₃ (1:1) | Outer Surface | 15.5 | 879 | 14 | 925 | 15 | 872 |
| | | Inner Surface | | | 14 | 830 | 14 | 830 |
| (7) | K₂SO₄ + KNO₃ (1:3) | Outer Surface | 15.5 | 705 | 16.5 | 782 | 15.5 | 643 |
| (8) | K₂SO₃ + KNO₃ (5:3) | Outer Surface | — | — | — | — | — | — |
| (9) | KCl + KNO₃ + K₂SO₄ (3:1:1) | Outer Surface | 16 | 1182 | 15 | 978 | 16 | 1106 |
| (10) | KCl only | Outer Surface | 8 | 850 | 15 | 748 | — | — |
| | | Inner Surface | | 810 | 8 | 600 | 8 | 600 |
| (11) | KNO₃ only | Outer Surface | 10 | 700 | 14 | 329 | 14 | 359 |
| | | Inner Surface | | 760 | 10 | 300 | 10 | 315 |
| (12) | K₂SO₄ only | Outer Surface | 12 | 930 | (13) | (800) | (11) | (730) |

I claim:

1. A method of chemically strengthening a glass article which comprises (1) applying a metal oxide-forming compound selected from the group consisting of tin compounds, titanium compounds, zirconium compounds and vanadium compounds to the outer surface of a heated glass article to form a metal oxide coating having a thickness of 50 to 130 Angstroms on the outer surface of the glass article, (2) applying a concentrated mixed solution of potassium chloride and potassium nitrate having a potassium chloride to potassium nitrate weight ratio of 85 to 45 : 15 to 55, or a concentrated mixed solution of potassium sulfate and potassium nitrate having a potassium sulfate to potassium nitrate weight ratio of 30 to 100 : 70 to 0, to the outer and inner surfaces of the thus treated glass article having a temperature of 30° to 75° C, (3) maintaining the resultant glass article at an elevated temperature below the strain point of the glass but as near the strain point as possible for a period of time sufficient to obtain a compressive stress layer having a depth of at least 10 microns and a compressive stress of at least 700 kg/cm², (4) cooling the thus heated glass article to room temperature and removing the mixture of the potassium salts remaining on the outer and inner surfaces of the glass article.

2. The method of claim 1, wherein in the mixed solution of potassium chloride and potassium nitrate, a part of the potassium chloride and potassium nitrate is substituted by potassium sulfate.

3. The method of claim 1, wherein the thickness of the metal oxide coating is 70 to 100 Angstroms.

4. The method of claim 1, wherein in the mixed solution of potassium sulfate and potassium nitrate, the quantity of potassium nitrate being greater than zero, a part of the potassium sulfate and potassium nitrate is substituted by potassium chloride.

5. The method of claim 1, wherein wetting aid is added to the mixed solution in a quantity of 0.2 to 1%.

6. The method of claim 5, wherein the wetting aid is selected from the group consisting of anionic surfactants.

7. The method of claim 1, wherein the mixed solution is applied to the glass article by dipping or spraying.

8. The method of claim 1, wherein the temperature of the mixed solution is 50° to 75° C.

9. The method of claim 1, wherein the liquidus temperature of the mixed salt is higher than or substantially equal to the strain point of the glass.

10. The method of claim 1, wherein the temperature of the glass article in step (2) is 50° to 60° C.

* * * * *